United States Patent [19]

Bednarski et al.

[11] Patent Number: 4,547,532
[45] Date of Patent: Oct. 15, 1985

[54] ANTIFOULING PAINT

[75] Inventors: John R. Bednarski, Flushing, N.Y.; Melvin H. Gitlitz; David A. Russo, both of Edison, N.J.

[73] Assignee: M&T Chemicals Inc., Woodbridge, N.J.

[21] Appl. No.: 563,420

[22] PCT Filed: Apr. 1, 1983

[86] PCT No.: PCT/US83/00516
§ 371 Date: Oct. 5, 1983
§ 102(e) Date: Oct. 5, 1983

[87] PCT Pub. No.: WO83/03423
PCT Pub. Date: Oct. 13, 1983

Related U.S. Application Data

[63] Continuation-in-part of Ser. No. 365,062, Apr. 2, 1982, abandoned.

[51] Int. Cl.$^4$ .............................................. C08L 33/02
[52] U.S. Cl. .................................... 523/122; 514/493; 524/178; 524/221; 524/431; 524/432
[58] Field of Search ......................... 424/288; 523/122; 524/178, 221, 431, 432

[56] References Cited

U.S. PATENT DOCUMENTS

| | | | |
|---|---|---|---|
| 2,901,452 | 8/1959 | West | 524/178 |
| 3,167,473 | 1/1965 | Leebrick | 167/38.6 |
| 3,755,595 | 8/1973 | Goring et al. | 424/288 |
| 3,896,044 | 7/1975 | Mago et al. | 423/229 |
| 4,128,429 | 12/1978 | Wyant et al. | 524/178 |
| 4,143,015 | 3/1979 | Soeterik | 523/122 |
| 4,187,211 | 2/1980 | Robinson et al. | 424/140 |
| 4,191,579 | 3/1980 | Hails et al. | 424/288 |

*Primary Examiner*—Lorenzo B. Hayes
*Attorney, Agent, or Firm*—S. H. Parker; R. E. Bright; J. Matalon

[57] ABSTRACT

The undesirable premature viscosity increase in polymer-based antifouling paints is retarded by incorporating into the formulation at least one hydroxylamine or alkanolamine in combination with a triorganotin compound. Alternatively, the reaction product of any of these materials may be utilized either singly or in combination with these components.

4 Claims, No Drawings

ANTIFOULING PAINT

This application is a continuation-in-part of Ser. No. 365,062, filed Apr. 2, 1982, and now abandoned.

BACKGROUND OF THE INVENTION

1. Field of the Invention

This invention relates to antifouling coating compositions. More particularly, this invention relates to stabilizer compositions that inhibit the increase in viscosity and eventual gelation which often occur during long term storage of antifouling coating compositions containing cuprous oxide and polymers wherein at least a portion of the repeating units are derived from triorganotin salts of ethylenically unsaturated acids.

2. Description of the Prior Art

The attachment and growth of organisms such as barnacles and algae to submerged portions of a ship's hull substantially increases the resistance of the hull to passage through water. The resultant decrease in fuel efficiency and maximum speed of the vessel is sufficient to justify periodic removal of the accumulated fouling. This a costly operation and usually requires that the ship be out of service in a drydock for a substantial period of time. One method commonly employed to inhibit the attachment and growth of fouling organisms to a hull, and thereby extend the period between successive cleanings and repaintings, is to apply a top coat containing an antifouling agent to all submerged portions of the hull. It has long been recognized that triorganotin compounds such as (tri-n-butyltin)fluoride are particularly effective antifouling agents. U.S. Pat. No. 3,167,473 to John R. Leebrick teaches that deficiencies associated with many triorganotin compounds, such as high mammalian toxicity and an excessively high rate of extractability of the triorganotin compound from a paint film by sea water, can be avoided by chemically incorporating the triorganotin compound into a film-forming polymer. In accordance with the teaching of this patent a triorganotin derivative of an ethylenically unsaturated acid such as acrylic or methacrylic acid is polymerized either alone or in the presence of other ethylenically unsaturated compounds, preferably lower alkyl esters of acrylic or methacrylic acid, that will copolymerize with the triorganotin derivative.

U.S. Pat. No. 4,191,579 to G. H. Hails and J. D. Symonds discloses that when an insoluble, seawater-reactive pigment and an insoluble non-reactive pigment are present in an antifouling topcoat applied to a hull, this combination imparts a self-leveling property to the coating as the ship moves through the water. The rate of dissolution is sufficient to release an effective concentration of toxicant while avoiding premature dissolution of the topcoat and the triorganotin-containing polymer employed as both the binder and the antifouling agents. This patent teaches that cuprous oxide and zinc oxide are two of the preferred seawater-reactive pigments. Coatings containing cuprous oxide and a polymer derived at least in part from a triorganotin salt of an ethylenically unsaturated acid are preferred due to the antifouling activity of cuprous oxide, however these coatings cannot be stored for more than six months due to premature gelation of the polymer. The patent discloses that if longer storage periods are required, the organotin-containing polymer and the cuprous oxide must be packaged as separate components. Such a two-package system is undesirable for commercial applications, since it can be difficult to achieve adequate uniform mixing of large amounts of two components. If the final composition is not homogeneous a coating applied using the composition may not contain the same toxicant level over its entire surface. Premature fouling is most likely to occur in those areas of relatively low toxicant concentration.

In accordance with the teaching of U.S. Pat. No. 4,187,211 to A. V. Robinson and J. Chapman, the storage stability of those antifouling compositions disclosed in the aforementioned U.S. Pat. No. 4,191,579 containing cuprous oxide as the seawater-reactive pigment can be substantially increased by including in the composition a relatively inert and water insoluble dehydrating agent such as the anhydrous and hemihydrate forms of calcium sulfate or various water-reactive organic compounds such as the aliphatic isocyanates. Experimental data have demonstrated that in an accelerated aging study conducted at a temperature of 50° C. the viscosity of a coating composition containing anhydrous calcium sulfate, a polymeric triorganotin toxicant and cuprous oxide increased at a faster rate than a control sample in which the calcium sulfate was omitted.

SUMMARY OF THE INVENTION

It has now been found that through the use of specific triorganotin compounds and nitrogen compounds and/or reaction products of these compounds, the gelatin of the coating compositions of the type disclosed in U.S. Pat. No. 4,191,579, can be prevented even after being stored for up to three months or longer at a temperature of 50° C. In addition, the viscosity of the compositions remain within acceptable limits for application to ship hulls by any of the conventional means.

This invention provides stabilizer compositions which effectively retard the gradual increase in viscosity and ultimate gelation characteristic of antifouling paints containing a polymeric triorganotin carboxylate and cuprous oxide. The stabilizer compositions comprise one or both of (1) a mixture containing (a) a monomeric triorganotin compound and (b) a secondary or tertiary hydroxylamine or alkanolamine, and (2) a reaction product of (a) and (b).

DETAILED DESCRIPTION OF THE INVENTION

This invention provides stabilizer compositions for antifouling coating formulations containing a solubilized polymeric, triorganotin carboxylate, cuprous oxide, and/or zinc oxide where the stabilizer comprises one or both of (1) a mixture containing (a) a triorganotin compound and (b) a nitrogen compound of the general formula

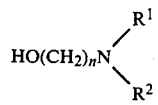

or (2) a reaction product of the triorganotin compound and nitrogen compound, where $R^1$ and $R^2$ are individually selected from the group consisting of hydrocarbyl, substituted hydrocarbyl, $(CH_2)_nOH$, hydrogen and

where $R^3$ is hdrocarbyl, with the proviso that $R^1$ and $R^2$ cannot both be hydrogen and n is 0 or an integer from 1 to 4, inclusive.

In a narrower embodiment of this invention the triorganotin compound exhibits the formula $R_3^4SnX$ or $(R_3^4Sn)_2Y$ where $R^4$ is hydrocarbyl, X is halogen, pseudohalogen or the residue remaining following removal of the labile hydrogen atom from an alcohol, phenol, mercaptan, carboxylic acid or mineral acid, $-OR^5$ or $-SR^5$, where $R^5$ is alkyl containing from 1 to 20 carbon atoms, phenyl or benzyl, Y is oxygen or sulfur, $R^1$ and $R^2$ of the foregoing formula for the nitrogen compound are hydrogen, alkyl, $(CH_2)_nOH$, cycloalkyl or aryl or acyl and n is 0, 2, 3 or 4, or one or both of $R^1$ and $R^2$ are $(CH_2)_nOH$ and any remaining $R^1$ and $R^2$ is hydrogen, n is 2 or 3 and the weight ratio of the triorganotin compound to the nitrogen compound is from 1:1 to 10:1, respectively. Preferably the triorganotin compound is an effective antifouling agent, in which instance $R^4$ is lower alkyl containing from 1 to 4 carbon atoms, a substituted lower alkyl, phenyl or substituted phenyl group. The nitrogen compound is an N,N-dialkyl, a mixed aryl alkyl, aryl acyl, or alkyl acyl hydroxylamine or a di- or trialkanolamine of the general formula $[HO(CH_2)_n]_mNH_{3-m}$ where m is 2 or 3, n is 2 or 3 and the weight ratio of the triorganotin compound to the nitrogen compound is from 3:1 to 6:1, respectively.

Most preferably the triorganotin compound is bis(tri-n-butyltin)oxide, the nitrogen compound is either an N,N-di(lower alkyl)hydroxylamine, such as N,N-diethylhydroxylamine, or an alkanolamine such as diethanolamine or triethanolamine. The weight ratio of the triorganotin compound to the nitrogen compound is about 5:1, respectively, when the nitrogen compound is a hydroxylamine and 4:1 to 6:1 when the nitrogen compound is an alkanolamine.

Another aspect of this invention provides antifouling coating compositions containing one of the aforementioned stabilizer compositions, cuprous oxide and at least one polymeric triorganotin carboxylate.

In a narrower embodiment the triorganotin carboxylate is a homopolymer of a tri(lower alkyl)tin- or triphenyltin salt of an ethylenically unsaturated acid or a copolymer of this salt and at least one additional copolymerizable ethylenically unsaturated compound.

In preferred embodiments the ethylenically unsaturated acid is acrylic or methacrylic acid and any comonomers employed to prepare the polymer are esters of acrylic or methacrylic acid and an alcohol containing from 1 to 8 carbon atoms. The repeating units containing the triorganotin ($R_3^4Sn-$) residue constitute from 20 to about 80 mole % of the repeating units present in the polymeric triorganotin carboxylate. The weight ratio of polymeric triorganotin carboxylate to cuprous oxide and/or zinc oxide is from about 3:1 to 1:7 and $R^4$ is butyl or phenyl.

THE NITROGEN COMPOUND

One of the components of the present stabilizer compositions is a hydroxylamine or a di- or trialkanolamine. These compounds exhibit the general formula

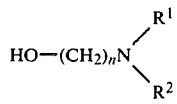

When the nitrogen compound is hydroxylamine, n is 0 and $R^1$ and $R^2$ can be identical or different hydrocarbyl, substituted hydrocarbyl, $(CH_2)_nOH$, hydrogen or acyl

groups, where $R^3$ is hydrocarbyl with the proviso that $R^1$ and $R^2$ cannot both be hydrogen. Preferably $R^1$ and $R^2$ are identical and represent linear or branched chain alkyl groups containing from 1 to 20 carbon atoms, benzyl, phenyl or benzoyl. Most preferably when $R^1$ and $R^2$ are alkyl they contain from 1 to 4 carbon atoms. As used in this specification the term "hydrocarbyl" includes linear and branched chain alkyl containing from 1 to 20 carbon atoms, cycloalkyl containing from 5 to 8 carbon atoms, aryl, alkyl substituted aryl groups (referred to as alkaryl) such as tolyl and xylyl and aryl substituted alkyl groups (referred to as aralkyl) such as benzyl and -phenylethyl. The hydrocarbyl groups represented by $R^1$ and $R^2$ in the foregoing formula can be unsubstituted or may contain 1 or more substituents. When substituents are present they can be relatively unreactive groups such as hydrocarbyloxy, cyano, carboxyl (RCOO— where R is hydrocarbyl) and nitro, or reactive groups such as halogen, hydroxyl, mercapto (—SH), carboxy (—COOH) and isocyanato (—N=C=O).

Preferably any substituents present should also not react with any components of the final coating formulation containing the stabilizer compositions of this invention, since such reactions could adversely affect the stability of the formulation.

The hydroxylamines and salts thereof that are commercially available include N,N-diethylhydroxylamine and N,N-dimethylhydroxylammonium hydrochloride. Representative hydroxylamines that can be employed according to the present invention include
N-phenyl, N-benzoyl hydroxylamine
N-benzoylhydroxylamine
N,N-dibenzoylhydroxylamine
N-methylhydroxylamine
N-butylhydroxylamine
N,N-dibutylhydroxylamine
N,N-trifluoromethylhydroxylamine
N-benzyl-N-o-tolylhydroxylamine
N-furoyl-N-phenylhydroxylamine
N,N-dimethylhydroxylamine
N-ethylhydroxylamine When the nitrogen compounds is a di- or tri- alkanolamine, n of the foregoing formula is an integer from 1 to 4, $R^1$ is $-(CH_2)_nOH$ and $R^2$ is $-(CH_2)_nOH$, a hydrocarbyl group or hydrogen. Preferably n is 2, $R^1$ is $-CH_2CH_2OH$ and $R^2$ is $-CH_2CH_2OH$ or hydrogen, this preference being based on the efficacy of stabilization.

Alkanolamines that can be employed according to this invention include
dimethylethanolamine
diethylethanolamine
ethylethanolamine
diisopropylethanolamine
butyldiethanolamine
methylethanolamine
methyldiethanolamine
ethyldiethanolamine isopropylethanolamine
n-butylethanolamine
dimethylisopropanolamine
cyclohexyldiethanolamine
phenylethanolamine
N-cyanoethyl-N-hydroxyethyl aniline
m-tolyldiethanolamine
o-methoxyphenyldiethanolamine.

THE TRIORGANOTIN COMPOUND

The triorganotin compound present in the stabilizer compositions of this invention contains three hydrocarbyl groups bonded to the tin atom. The fourth valence of the tin atom is satisfied by oxygen, sulfur, a halogen atom, a pseudohalogen or the residue remaining following removal of the labile hydrogen atom from an organic or inorganic acid, alcohol, phenol, mercaptan, mercaptoalcohol or ester thereof, mercaptocarboxylic acid or ester thereof, or any other organic or inorganic compound containing a labile hydrogen atom. When an oxygen or sulfur atom is bonded to tin, the compound is a bis(triorganotin)oxide or -sulfide, respectively.

Preferably the three hydrocarbyl groups bonded to the tin atom are either lower alkyl containing from 1 to about 6 atoms or phenyl. This preference is based on the relatively high level of activity against fouling organisms exhibited by this class of compounds. This activity complements the antifouling activity of the polymeric triorganotin compound and the cuprous oxide that comprise the toxicant component of antifouling coating compositions containing the stabilizer compositions of this invention. The three hydrocarbyl groups bonded to the tin atom can be identical or different. Triorganotin compounds containing 2 or 3 different hydrocarbyl groups bonded to tin are reported in the literature.

When the fourth group bonded to the tin atom is halogen it can be fluorine, chlorine, bromine or iodine. The term "pseudohalogen" refers to inorganic radicals which, when in the form of anions exhibit chemical properties similar to those of the halide ions, in that they combine with hydrogen to form acids and react with silver ion to form water-isoluble salts. The pseudohalide ions include cyanide, thiocyanate ($SCN^-$), cyanate ($OCN^-$), isocyanate ($NCO^-$) and isothio-cyanate ($NCS^-$).

Suitable carboxylic acids that can be reacted with a triorganotin halide, hydroxide or bis(triorganotin)oxide to form triorganotin compounds suitable for use in preparing the compositions of this invention include but are not limited to acetic, propionic, butyric, hexanoic, octanoic, dodecanoic, 2-ethylhexoic, eicosanic, benzoic and cyclohexanecarboxylic. Suitable inorganic acids can be mono- or polyfunctional and include among others, nitric, phosphoric, phosphorous and sulfuric.

EXAMPLE I

This example demonstrates the reduced rate of viscosity increase exhibited by an antifouling paint formulation containing a stabilizer composition of this invention relative to an unstabilized formulation.

A paint formulation was prepared by blending 0.8 g of Bentonite Clay (Bentone ®27) and 5.2 g of Colloidal Silica (Cab-O-Sil-PTG) in a mixture of 0.9 g of methanol, 33.7 g of methyl isobutyl ketone and 65.2 g of xylene, in a quart (1 liter) sized stainless steel container for approximately five (5) minutes. To this container was added 250.4 g of an organotin acrylate copolymer solution, 229.6 g zinc oxide and 164.2 g of cuprous oxide (Glidden Co.) along with approximately 400 ml of steel shot, approximately $\frac{1}{8}"$ in diameter. The paint was shaken on a Red Devil Paint Shaker for approximately one hour. The paint had a fineness of grind of 5 (approximately 30 microns) on a Hegman gauge. The steel shot was removed by passing the paint through a fine mesh tea strainer. A solution of 4.17 g of bis(tri-m-butyltin)oxide, 0.83 g of N,N-diethylhydroxylamine and 5.0 g of methyl isobutyl ketone was slowly dispersed into the paint under high speed stirring. Stirring was continued for 5 minutes after complete dispersal. The viscosity was determined at 25° C., using a Brookfield viscometer, Model RVF-100 and a number 4 spindle rotating at a speed of 20 rpm.

The organotin acrylate copolymer solution employed in the formulation was prepared as described in U.S. Pat. No. 4,260,535, the relevant portions of which are hereby incorporated by reference.

After the viscosity had been measured, a sample of the coating composition was subjected to an accelerated aging test by placing it in a thermostatically controlled oven maintained at a temperature of 50° C. After 12 weeks the viscosity increased from 800 to 1500 centipoises, which is considered acceptable for a commercial antifouling paint. For purposes of comparison, a paint of the same formulation in which the bis(tri-n-butyl)tin oxide and N,N-diethylhydroxylamine were omitted exhibited an initial viscosity of 3100 centipoises. After 12 weeks at 50° C., the viscosity increased to 22,000 centipoises.

The correlation between the rate of viscosity increase of a paint observed during an accelerated stability test conducted at elevated temperature with the rate that would be observed at ambient temperature is estimated to be twelve weeks at 50° C. equals one year at room temperature.

Addition examples of this invention appear in Table I. The added stabilizers show significant viscosity stabilization over those systems which only contain added solvent.

The efficiency of stabilizers of the same composition was found to depend on the method of paint preparation. The amount of polymer and stabilizer in the grinding or let-down phases of the paint preparation as well as the grinding time influenced the viscosity stability of the paint as Table II illustrates. When the paint processing variables are taken into account, the effectiveness of the TBTO/DEHA stabilizer system versus TBTO is clearly demonstrated as Table III illustrates.

| Ingredient | Parts by Weight |
|---|---|
| *Cu$_2$O TEST PAINT FORMULATION TEST FORMULA 1 | |
| Organotin copolymer solution (50% solids) | 276.9 |
| ZnO | 254.0 |
| Cu$_2$O | 181.7 |
| Cab-o-Sil[a] | 5.8 |
| Bentone 27[b] | 0.84 |
| MeOH | 0.98 |
| MIBK | 21.6 |
| Xylene | 72.1 |
| ***Cu$_2$O TEST PAINT FORMULATION TEST FORMULA 2 | |
| Organotin copolymer solution (50% solids) | 406.5 |
| Cu$_2$O | 333.0 |
| Fe$_2$O$_3$ | 289.0 |
| Bentone 38[b] | 7.5 |

| -continued | |
|---|---|
| Ingredient | Parts by Weight |
| Methanol | 2.5 |
| Xylene | 210.0 |

[a] Cabot Corp., Boston, Mass.
[b] NL Industries Inc., Hightstown, N.J.

TABLE I

STABILIZERS FOR ANTIFOULING PAINTS*
Viscosity (CPS)
Time (Weeks) at 50° C.

| Composition | Trial | 0 | 1 | 3 | 4 | 5 | 6 | 7 | 8 | 9 | 10 | 11 | 12 |
|---|---|---|---|---|---|---|---|---|---|---|---|---|---|
| 2% **TBTO/DEHA (5/1) | 1 | 1500 | | | | | | | | | | | 4700 |
| | 2 | 1250 | | | | | | | | | | | 3600 |
| | 3 | 1600 | | | | | | | | | 4600 | | 5200 |
| 2% R.P. TBTO (1 mole)/ | 1 | 1600 | | | | | | | | | | | 4650 |
| DEHA (2 mol) | 2 | 1600 | | | | | | | | | 3800 | | 5000 |
| 2% TBTO/DEA (5.7/1) | | 550 | | | | | | | | 5400 | 10000 | | |
| 2% R.P. TBTO/DEA (1 mol/1 mol) | | 1100 | | | | | | | | 3700 | 6000 | | 17200 |
| 2% TBTO/TEA (5.9/1) | | 900 | | | | | | | 5450 | 10000 | | | |
| 2% R.P. TBTO/TEA (1 mol/0.67 mol) | | 2600 | | | | | 4950 | | | 13000 | | | |
| 2% TBTO | | 1160 | | | | | | 4200 | | 5750 | | 10600 | |
| 3% TBTO | | 1420 | | | | | | | | 5100 | | | 7350 |
| 0.5% DEHA*** | | 500 | | | | | | | | Gelled | | | |
| 0.22% DEHA*** | | 575 | | | | | | | | 9300 | | | |
| 2% DEA | | 1450 | 13000 | | | | | | | | | | |
| 2% TEA | | 2600 | 120000 | | | | | | | | | | |
| 2% ETOH | | 3150 | | | | 25000 | | | | | | | |
| 2% MIBK | | 4100 | | | | 25000 | | | | | | | |

Ratios are on a weight basis unless otherwise indicated.
*Composition of paints attached (Test Formula 1).
**Stabilizers added at 2% by weight of organotin copolymer solution.
***Paint contained only Cu₂O pigment. No ZnO was used (Test Formula 2).
R.P. = Reaction Product
TBTO bis(tributyltin)oxide
DEHA N,N—diethylhydroxylamine
DEA diethanolamine
TEA triethanolamine
ETOH ethanol
MIBK methyl isobutyl ketone

TABLE II

Effect of Processing Variables on Stabilizer Efficiency

| | | Grind Time | | | | | |
|---|---|---|---|---|---|---|---|
| | | 7.5 min. | | 30 min. | | 60 min. | |
| Stabilizer | Processing Variables | Vi (cp) | Vf (cp) | Vi (cp) | Vf (cp) | Vi (cp) | Vf (cp) |
| 2% TBTO/ DEHA | In grind with 20% polymer | 1930 | 4665 | 1900 | 5030 | — | — |
| | In grind with 75% polymer | 1710 | 3590 | 1800 | 1465 | — | — |
| 2% TBTO DEHA | In let down with 20% polymer | 1170 | 2750 | 1100 | 1910 | 1060 | 2150 |
| | In let down with 75% polymer | 1860 | 3705 | 1960 | 3160 | 1500 | 3420 |

TABLE III

Effect of Processing Variables on Stabilizer Efficiency

| | | With 20% Polymer | | | With 75% Polymer | | |
|---|---|---|---|---|---|---|---|
| Stabilizer | Variables | Vi (cp) | Vf (cp) | % Δ | Vi (cp) | Vf (cp) | % Δ |
| 2% TBTO DEHA | In grind, 30 minutes | 2000 | 4150 | 108 | 2060 | 2720 | 32 |
| 2% TBTO | In grind, 30 minutes | 1240 | 5115 | 312 | 1950 | 7240 | 271 |

Vi = initial viscosity
Vf = final viscosity
Δ = increase
cp = centipoise

What is claimed is:

1. In an antifouling paint composition comprising (1) a solubilized polymer derived at least in part from at least one triorganotin derivative of an ethylenically unsaturated acid and a pigment comprising cuprous oxide, zinc oxide or a mixture of cuprous and zinc oxides; the improvement comprising a viscosity stabilizer consisting of at least one of (a) a mixture of an organotin compound comprising a bis(tri-lower alkyltin)oxide and a nitrogen compound of the general, formula

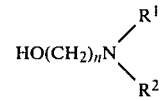

where $R^1$ and $R^2$ are lower alkyl and n is 0 or an integer from 1-4 or (b) the reaction product of said organotin compound and said nitrogen compound; wherein the weight ratio of organotin compound to nitrogen compound is from 1:1 to 10:1.

2. An antifouling paint composition according to claim 1 where the concentration of the viscosity stabilizer is from 0.1 to 10, based on the weight of the polymer solids.

3. An antifouling paint composition according to claim 2 where the concentration of the viscosity stabilizer is from about 0.5 to about 6%, based on the weight of the polymer solids.

4. An antifouling paint composition according to claim 1 where the composition includes an non-reactive solvent.

* * * * *